United States Patent [19]

Hamada

[11] 4,403,343
[45] Sep. 6, 1983

[54] DIVERSITY RECEIVER

[75] Inventor: Masanori Hamada, Toda, Japan

[73] Assignee: Clarion Co., Ltd., Tokyo, Japan

[21] Appl. No.: 306,565

[22] Filed: Sep. 28, 1981

[30] Foreign Application Priority Data

Sep. 30, 1980 [JP] Japan .................. 55-138842[U]

[51] Int. Cl.³ .......................... H04B 1/16; H04B 7/08
[52] U.S. Cl. .................................. 455/134; 455/140;
455/277; 455/154
[58] Field of Search ............... 455/8, 10, 52, 133–135,
455/140, 154, 157, 277, 278

[56] References Cited

U.S. PATENT DOCUMENTS 3,268,816  8/1966  Featherston ................ 455/133
4,035,728  7/1977  Ishikawa et al. ............ 455/134

FOREIGN PATENT DOCUMENTS 958772  12/1974  Canada ........................ 455/132
52-69512  6/1977  Japan ........................... 455/134
54-37519  3/1979  Japan ........................... 455/133
553671  6/1943  United Kingdom ........ 455/277

Primary Examiner—Jin F. Ng
Attorney, Agent, or Firm—Flynn, Thiel, Boutell & Tanis

[57] ABSTRACT

A diversity receiver which comprises two pairs of antennas and tuners and a comparator for comparing two signals obtained from said two tuners so that one of the tuners is selected in response to the result obtained in the comparator includes an antenna switching circuit and an operating antenna indicating circuit which are connected to the comparator so that the antenna associated with the selected tuner by the operation of the antenna switching circuit is indicated in the operating antenna indicating circuit.

3 Claims, 1 Drawing Figure

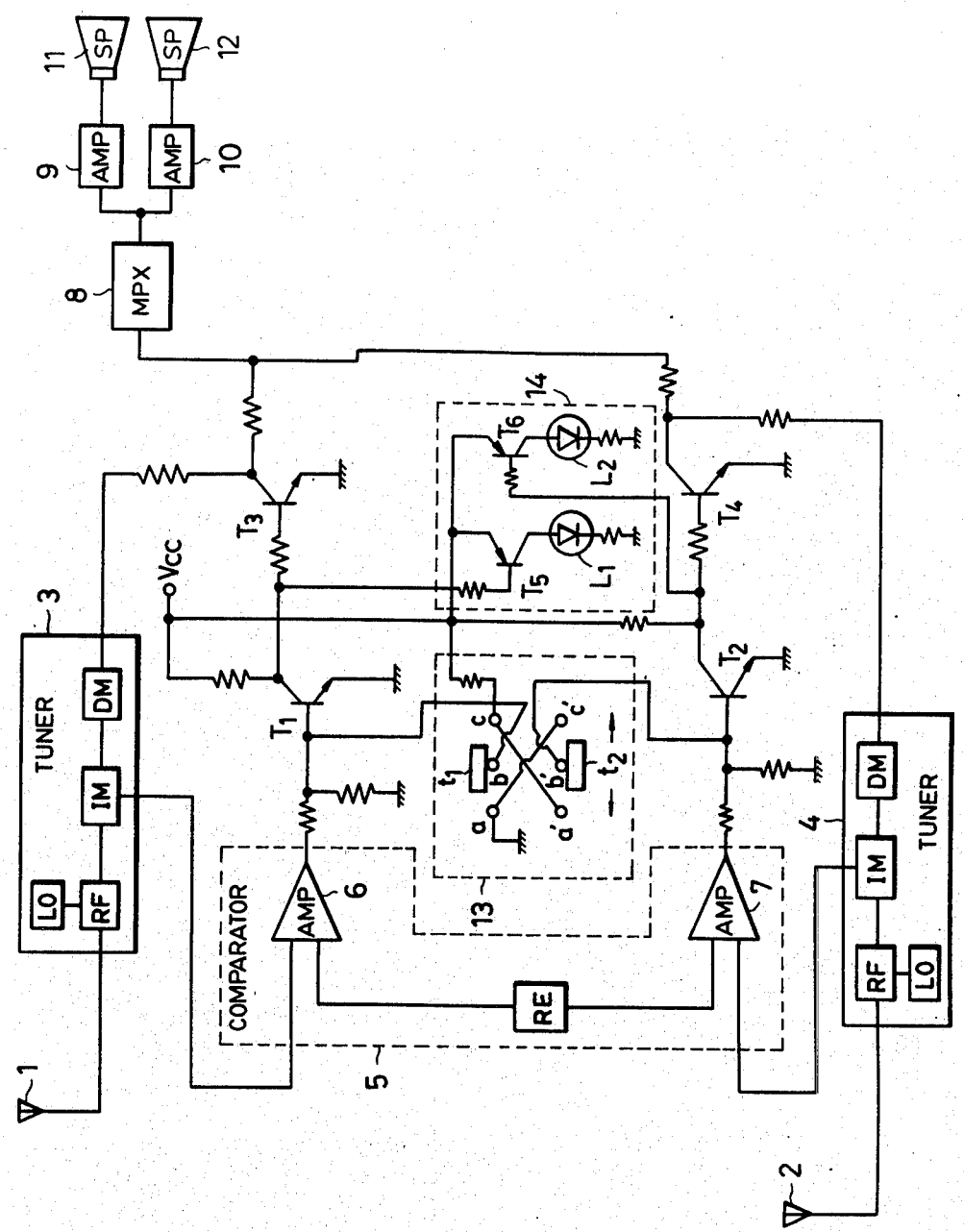

DIVERSITY RECEIVER

BACKGROUND OF THE INVENTION

1. Field of the Invention

This invention relates to a diversity receiver, and more particularly to a diversity receiver for use in a car having an antenna switching circuit including a manual and automatic switches so that an antenna which is actually operating due to a switching operation of the switches is always indicated.

2. Description of the Prior Art

In a diversity receiver for use in a car having two pairs of antennas and tuners capable of being switched in accordance with conditions of received waves, these two antennas each have to operate so as to compensate for a fault of the other (degradation of received electric field intensity, prevention by a multipath, etc.)

As such two antennas for use in a car, extensible rod-like antennas are generally used. Those antennas cannot achieve complete receiving effect of a diversity system if they are not sufficiently extended. Further, those antennas have to be held in a favourable mounting position and at an adequate angle.

However, in a conventional diversity receiver for use in a car, although the receiver operates in a manner automatically switching to the one of those two antennas which is in a better wave-receiving condition, it is not possible to check whether those antennas are in sufficient conditions in view of the above-mentioned points. That is, even if one of the antennas is out of such complete mounting condition or it is cut off, such situations could not be noted. Therefore, sufficient functions as a diversity receiver could not be performed.

OBJECT OF THE INVENTION

It is therefore an object of the present invention to provide a diversity receiver comprising an antenna switching circuit as well as an operating antenna indicating circuit and capable of allowing the operating antenna indicating circuit to display an antenna which is actually operating in accordance with the operation of the antenna switching circuit.

SUMMARY OF THE INVENTION

In accordance with the present invention, there is provided a diversity receiver which comprises:

at least two antennas;

tuner circuits connected to said antennas, respectively;

a comparator for comparing signals responsive to received electric field intensities from said tuner circuits;

a switching circuit for selecting an output of one of said tuner circuits having a higher received electric field intensity in response to an output from said comparator;

an antenna switching circuit for actuating said switching circuit to select an output of a desired one of said tuner circuits irrespective of outputs from said comparator; and an antenna indicating circuit for indicating operation of selected one of said tuner circuits.

BRIEF DESCRIPTION OF THE DRAWING

The drawing shows a circuit diagram illustrating an embodiment according to the present invention.

DETAILED DESCRIPTION OF THE PREFERRED EMBODIMENT

The present invention will now be described in detail referring to the preferred embodiment illustrated in the drawing.

The drawing shows a circuit diagram illustrating an embodiment according to the present invention in which the reference numerals 1, 2 denote antennas, and 3, 4 are tuners. The tuners 3, 4 each comprises a high frequency amplifier RF, an intermediate frequency amplifier IM, a detector DM and a local oscillator LO. In each of the tuners 3, 4, signals responsive to electric field intensities of received waves are detected to be thereby applied to respective inputs of differential amplifiers 6, 7 which construct a comparator 5. The other inputs of the differential amplifiers 6, 7 are supplied with reference signals from a reference power source RE. Reference numerals $T_1$, $T_2$ designate inverting transistors $T_3$, $T_4$ switching transistors, 8 a multiplexer connected to both of the switching transistors $T_3$, $T_4$, 9, 10 low frequency amplifiers and 11, 12 loudspeakers. Further, reference numeral 13 designates an antenna switching circuit and 14 is an operating antenna indicating circuit, both being connected to the comparator 5. The antenna switching circuit 13 comprises a two direction switch having two circuits as well as mutual contacts and providing manual and automatic switching functions for selecting one of the antennas 1, 2. The antenna switching circuit 13 includes contacts a, b, c, a', b', c' and slidable contacts $t_1$, $t_2$. The operating antenna indicating circuit 14 includes transistors $T_5$, $T_6$ and light-emitting elements $L_1$, $L_2$ such as LED, etc. connected to the transistors $T_5$, $T_6$, respectively, so as to operate in accordance with switching operations of the transistors $T_3$ and $T_4$.

With this arrangement, when the slidable contacts $t_1$, $t_2$ are switched to the mutual contacts b, b', the antenna switching circuit is set in the usual automatic switching mode thus to automatically select one of the antennas which is in a better receiving condition.

That is, signals responsive to electric field intensities of received waves from the intermediate frequency amplifiers IM of the tuners 3, 4 are compared in the comparators 5. As the result, one of the transistors $T_3$, $T_4$ corresponding to signal of a larger intensity is turned off and the output of the associated tuner is applied to the multiplexer 8.

Next, when the slidable contacts $t_1$, $t_2$ are switched to the mutual contacts a, a', the transistor $T_1$ is forcedly grounded to be off, and at the same time, the transistor $T_2$ is biased to a plus electric potential to be on. As the result, the transistor $T_3$ is turned on and the transistor $T_5$ is accordingly turned on thus to light on the light-emitting element $L_1$. Therefore, the fact that the antenna 1 is operating is indicated.

Next, when the slidable contacts $t_1$, $t_2$ are switched to the contacts c, c', contrary to the above case, the transistor $T_2$ is turned off to accordingly put on the transistors $T_4$, $T_6$, thus lighting the light-emitting element $L_2$. Therefore, the fact that the antenna 2 is operating is indicated.

Even in the automatic mode of the antenna switching circuit, it is apparent from the above-description that the light-emitting element $L_1$ lights on while the antenna 1 operates and the light-emitting element $L_2$ lights on while the antenna 2 operates. Therefore, in both of the manual switching and automatic switching modes of the antenna switching circuit, an actually operating antenna is always indicated by a light-emitting element.

As apparent from the description, according to the present invention, which provides an antenna switching circuit and an operating antenna indicating circuit so as to always indicate an antenna actually operating in response to the operations of the antenna switching circuit, it is possible to always acknowledge at sight which antenna is actually operating. Further, by manually switching the antenna switching circuit to switch to a desired antenna, it is possible to check if the mounting positions and angles, etc. are in favourable conditions as well as to know if the antennas 1, 2, when they are extensible antennas, are completely extended or not.

Additionally, it is possible to easily compare the usual receiving condition of a single antenna in the manually switching mode and the diversity receiving condition in the automatically switching mode, resulting in performing sufficient function as a diversity receiver.

The embodiments of the invention in which an exclusive property or privilege is claimed are defined as follows:

1. A diversity receiver, which comprises:

two antennas;

two tuner circuits, each connected to a respective said antenna and each producing an output signal derived from a received signal and an intensity signal proportional to the electric field intensity of said received signal;

comparator means for comparing said intensity signal from said tuner circuits to a reference signal;

signal switching circuit means responsive to said comparator means for supplying said output signal of each said tuner circuit to a further circuit in response to a comparison signal from said comparator means which is a function of the intensity of the corresponding intensity signal;

antenna switching circuit means cooperable with said signal switching circuit means for selectively causing said signal switching circuit means to supply only a selected one of said output signals to said further circuit independently of said comparison signals from said comparator means;

antenna indicating circuit means connected to said signal switching circuit means and said antenna switching circuit means and having two indicators, each said indicator being associated with a respective said tuner circuit and being energized when said output signal of such tuner circuit is being supplied by said signal switching circuit means to said further circuit.

2. The diversity receiver of claim 1, wherein said indicators are light-emitting elements.

3. A diversity receiver, comprising substantially identical first and second circuits and a third circuit which has an input, said first and second circuits each including an antenna, a tuner circuit which is connected to said antenna and has first and second outputs, said tuner circuit producing at said first output an output signal derived from a received signal and producing at said second output an intensity signal proportional to the electric field intensity of said received signal, a differential amplifier having two inputs and an output, said two inputs of said differential amplifier being respectively connected to said second output of said tuner circuit and to a reference signal, a first transistor having its emitter connected to ground, its collector connected through a resistor to a power source and its base connected through respective resistors to ground and to the output of said differential amplifier, manually operable switch means for selectively grounding the base of said first transistor, a second transistor having its emitter connected to said power source and its base connected through a resistor to the collector of said first transistor, a light-emitting diode and a resistor connected in series with each other between the collector of said second transistor and ground, and a third transistor having its emitter connected to ground, its base connected through a resistor to the collector of said first transistor, and its collector connected through respective resistors to said first output of said tuner circuit and to said input of said third circuit.

* * * * *

UNITED STATES PATENT AND TRADEMARK OFFICE
CERTIFICATE OF CORRECTION

PATENT NO. : 4 403 343
DATED : September 6, 1983
INVENTOR(S) : Masanori Hamada

It is certified that error appears in the above—identified patent and that said Letters Patent is hereby corrected as shown below:

Column 3, line 31; after "comparing" insert ---each---.

Signed and Sealed this

Sixth Day of March 1984

[SEAL]

Attest:

GERALD J. MOSSINGHOFF

*Attesting Officer*   *Commissioner of Patents and Trademarks*